(12) United States Patent
McFarland

(10) Patent No.: US 10,330,261 B2
(45) Date of Patent: Jun. 25, 2019

(54) SYSTEM AND METHOD FOR A HEATED GAS CYLINDER ASSEMBLY

(71) Applicant: GOODRICH CORPORATION, Charlotte, NC (US)

(72) Inventor: Eric McFarland, Laveen, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/036,694

(22) Filed: Jul. 16, 2018

(65) Prior Publication Data

US 2018/0328539 A1     Nov. 15, 2018

Related U.S. Application Data

(62) Division of application No. 15/363,997, filed on Nov. 29, 2016, now Pat. No. 10,054,265.

(51) Int. Cl.
| | |
|---|---|
| *F17C 7/00* | (2006.01) |
| *F17C 1/00* | (2006.01) |
| *B64D 25/14* | (2006.01) |

(52) U.S. Cl.
CPC .............. *F17C 7/00* (2013.01); *B64D 25/14* (2013.01); *F17C 1/005* (2013.01); *F15B 2211/218* (2013.01); *F17C 2227/0332* (2013.01)

(58) Field of Classification Search
CPC ........ F17C 1/005; F17C 7/00; F17C 2227/00; F17C 2227/03; F17C 2227/0309; F17C 2227/0332; B64D 25/14; F15B 2211/218
USPC ................. 222/3, 4, 6, 603; 280/736, 741
See application file for complete search history.

(56) References Cited

U.S. PATENT DOCUMENTS

| | | | |
|---|---|---|---|
| 3,836,170 A | 9/1974 | Grosch et al. | |
| 3,890,174 A | 6/1975 | Helms, Jr. | |
| 5,242,194 A | 9/1993 | Popek | |
| 5,299,828 A * | 4/1994 | Nakajima | B60R 21/2644 280/741 |
| 5,423,570 A | 6/1995 | Kort | |
| 5,542,704 A * | 8/1996 | Hamilton | B60R 21/2644 149/36 |
| 5,664,803 A | 9/1997 | Skånberg et al. | |

(Continued)

FOREIGN PATENT DOCUMENTS

| | | |
|---|---|---|
| EP | 0616927 | 9/1994 |
| WO | 9947452 | 9/1999 |

OTHER PUBLICATIONS

European Patent Office, European Search Report dated May 17, 2018 in Application No. 17204453.9-1010.

(Continued)

*Primary Examiner* — Lien M Ngo
(74) *Attorney, Agent, or Firm* — Snell & Wilmer, L.L.P.

(57) ABSTRACT

Systems and methods for a heated gas cylinder assembly are disclosed. The heated gas cylinder assembly may comprise a cylinder shell and a heat exchanger disposed within the cylinder shell. The heat exchanger and the cylinder shell may define an interior chamber configured to hold a gas mixture. The heat exchanger may comprise an inner bore configured to receive a pyrotechnic composition. In response to igniting the pyrotechnic composition, the heat exchanger may provide thermal conduction to the gas mixture. The gas mixture may be simultaneously heated and released, or the gas mixture may be preheated before release.

5 Claims, 4 Drawing Sheets

(56) References Cited

U.S. PATENT DOCUMENTS

| | | | |
|---|---|---|---|
| 5,931,495 A | 8/1999 | Rink | |
| 6,068,292 A | 5/2000 | Renz | |
| 6,170,399 B1 | 1/2001 | Nielson | |
| 7,040,657 B2 | 5/2006 | Iwai | |
| 7,210,703 B2 | 5/2007 | Young | |
| 7,267,365 B2 * | 9/2007 | Quioc | B60R 21/2644 280/736 |
| 7,431,335 B2 | 10/2008 | Khandhadia | |
| 8,376,400 B2 | 2/2013 | Mason | |
| 8,393,641 B1 * | 3/2013 | Quioc | B60R 21/2644 280/741 |
| 2003/0230882 A1 | 12/2003 | Hosey | |
| 2005/0110253 A1 * | 5/2005 | Khandhadia | B60R 21/272 280/736 |
| 2005/0263994 A1 | 12/2005 | Quioc | |

OTHER PUBLICATIONS

USPTO; Non-final Office Action dated Jan. 22, 2018 in U.S. Appl. No. 15/363,997.
USPTO; Notice of Allowance dated May 30, 2018 in U.S. Appl. No. 15/363,997.
USPTO; Corrected Notice of Allowance dated Jun. 15, 2018 in U.S. Appl. No. 15/363,997.

* cited by examiner

SYSTEM AND METHOD FOR A HEATED GAS CYLINDER ASSEMBLY

CROSS REFERENCE TO RELATED APPLICATIONS

This application is a divisional of, claims priority to and the benefit of, U.S. Ser. No. 15/363,997 filed Nov. 29, 2016 entitled "SYSTEM AND METHOD FOR A HEATED GAS CYLINDER ASSEMBLY," which is incorporated herein its entirety by reference for all purposes.

FIELD

The present disclosure relates to compressed gas cylinder assemblies, and more specifically, to systems and methods for a heated gas cylinder assembly.

BACKGROUND

Various industries, such as automotive, marine, aircraft, medical, sporting equipment, food and beverage, plumbing and electrical industries, may use compressed gas tank assemblies or high-pressure gas cylinders for storage and delivery of pressurized fluid. For example, compressed gas cylinder assemblies (or inflation assemblies) may be used with aircraft evacuation systems. In that respect, the compressed gas cylinder may supply gas to inflate life rafts, evacuation slides, and/or other floats to be used in evacuation situations. The amount of gas needed to provide inflation may vary as the operating temperature changes (e.g., heated gas is capable of doing more work than cold gas). Typically, an external propellant system, such as a solid propellant gas generator, may mix hot gas with the gas supplied from the compressed gas cylinder to account for cold operating temperatures.

SUMMARY

In various embodiments, a gas cylinder assembly is disclosed. The gas cylinder assembly may comprise an outer shell defining an interior chamber. The gas cylinder assembly may comprise a heat exchanger disposed within the interior chamber. The heat exchanger may comprise an inner bore. A pyrotechnic composition may be disposed within the inner bore.

In various embodiments, the pyrotechnic composition may comprise a metal oxide aluminum thermite. In various embodiments, the heat exchanger may comprise a heat exchanger spoke extending radially outward from the heat exchanger. In various embodiments, the gas cylinder assembly may further comprise an igniter disposed within the pyrotechnic composition and configured to ignite the pyrotechnic composition. In various embodiments, the gas cylinder assembly may further comprise an inner shell coupled to a radially outer surface of the heat exchanger. The inner shell may be configured to at least partially cover the heat exchanger. A first end of the inner shell may be coupled to an outlet of the outer shell to allow for a flow of a gas between the heat exchanger and the inner shell and through the outlet. In various embodiments, the heat exchanger may be aluminum.

In various embodiments, a gas cylinder assembly may comprise a gas cylinder and an outlet assembly fluidly coupled to an outlet of the gas cylinder. The gas cylinder assembly may comprise a heat exchanger disposed within the gas cylinder. The heat exchanger may comprise an inner bore. The heat exchanger and the gas cylinder may define an interior chamber. A pyrotechnic composition may be disposed within the inner bore.

In various embodiments, the gas cylinder assembly may further comprise an igniter disposed within the pyrotechnic composition and configured to ignite the pyrotechnic composition. In various embodiments, the gas cylinder assembly may further comprise an igniter control configured to transmit an ignition signal to the igniter to control ignition of the pyrotechnic composition. The heat exchanger may comprise a heat exchanger spoke extending radially outward from the heat exchanger. In various embodiments, the gas cylinder assembly may further comprise an inner shell coupled to a radially outer surface of the heat exchanger spoke. The inner shell may be configured to at least partially cover the heat exchanger. A first end of the inner shell may be coupled to the outlet of the gas cylinder to allow for a flow of a gas between the heat exchanger and the inner shell and through the outlet. In various embodiments, an inflatable device may be in fluid connection with the outlet assembly. In various embodiments, the pyrotechnic composition may comprise a metal oxide aluminum thermite.

In various embodiments, a method of releasing a heated gas mixture is disclosed. The method may comprise igniting a pyrotechnic composition. The pyrotechnic composition may be dispersed within an inner bore of a heat exchanger, the heat exchanger may be disposed within a gas cylinder, and the gas cylinder and the heat exchanger may define an interior chamber comprising a gas mixture. The method may comprise heating, by the heat exchanger, the gas mixture to create the heated gas mixture. The method may comprise releasing the heated gas mixture from an outlet of the gas cylinder.

In various embodiments, the gas mixture may be heated for a predetermined time prior to releasing the heated gas mixture. In various embodiments, the gas cylinder may comprise an inner shell coupled to the outlet and configured to at least partially cover the heat exchanger. The inner shell may be configured to enable a flow of the heated gas mixture between the heat exchanger and the inner shell through the outlet. In various embodiments, the heated gas mixture may be heated and released simultaneously. In various embodiments, the method may further comprise transmitting, by an igniter control, an ignition signal to an igniter disposed within the pyrotechnic composition. The igniter may be configured to ignite the pyrotechnic composition in response to receiving the ignition signal.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
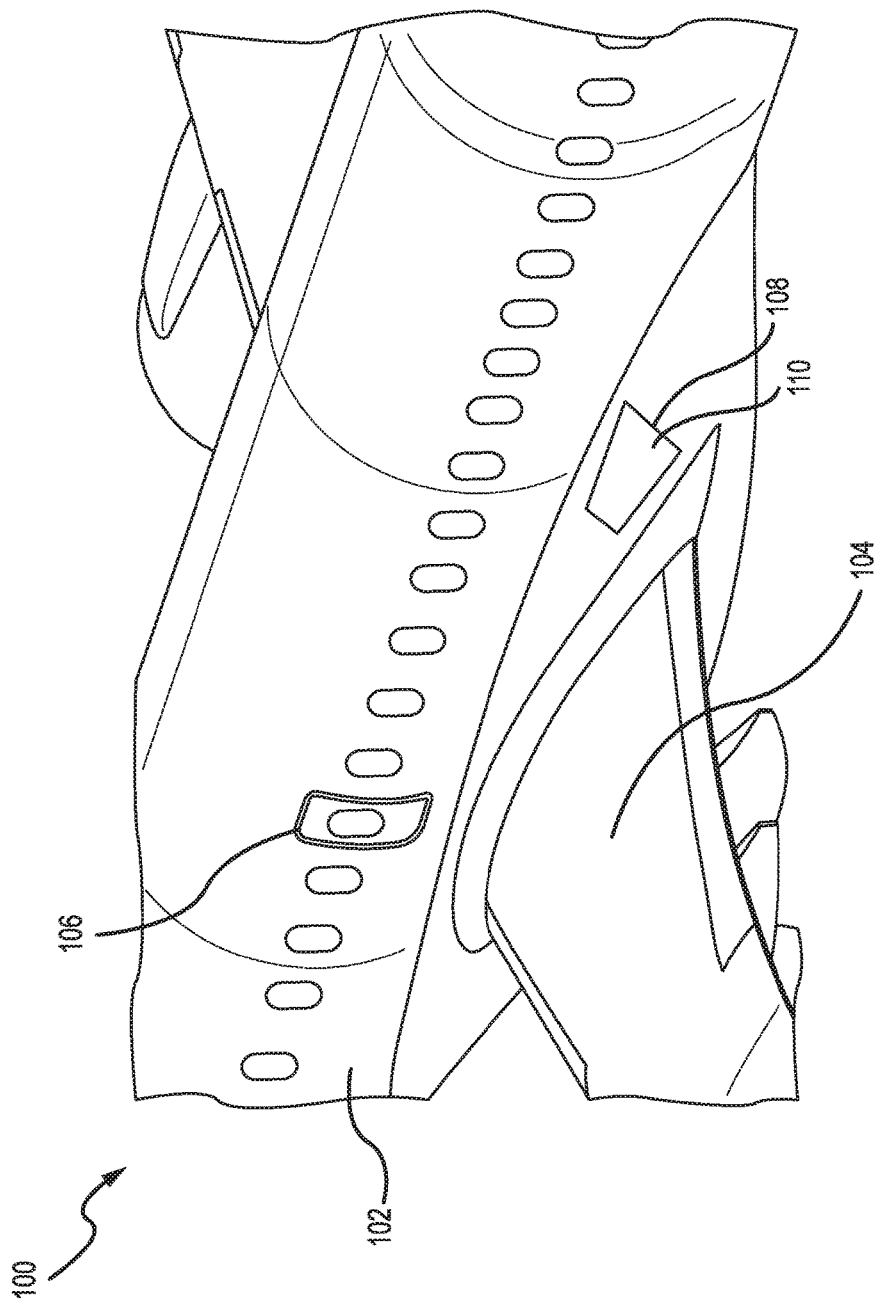
FIG. 1 illustrates an exemplary aircraft with an evacuation system, in accordance with various embodiments.

In various embodiments, and with reference to FIG. 1, an exemplary aircraft 100 is depicted. The present disclosure describes gas cylinders and heated gas cylinder assemblies with respect to inflatable evacuation systems of an aircraft 100, however, it will be understood the systems and methods of the present disclosure may be suitable for use in other systems having compressed gas systems. Aircraft 100 may comprise a fuselage 102 with wings 104 fixed to fuselage 102. Emergency exit door 106 may be disposed on fuselage 102 and an evacuation system 108 may be stored, for example, in an undeployed condition in a packboard (container) housing inside the fuselage of aircraft 100. A panel 110 may cover evacuation system 108 when installed within aircraft 100. Evacuation system 108 may jettison panel 110 and deploy an inflatable device, such as an inflatable slide, in response to emergency exit door 106 opening. Evacuation system 108 may include a heated gas cylinder assembly 112 coupled to an inflatable device 114 and configured to inflate the inflatable device 114 (see FIG. 2).

Figure 2:
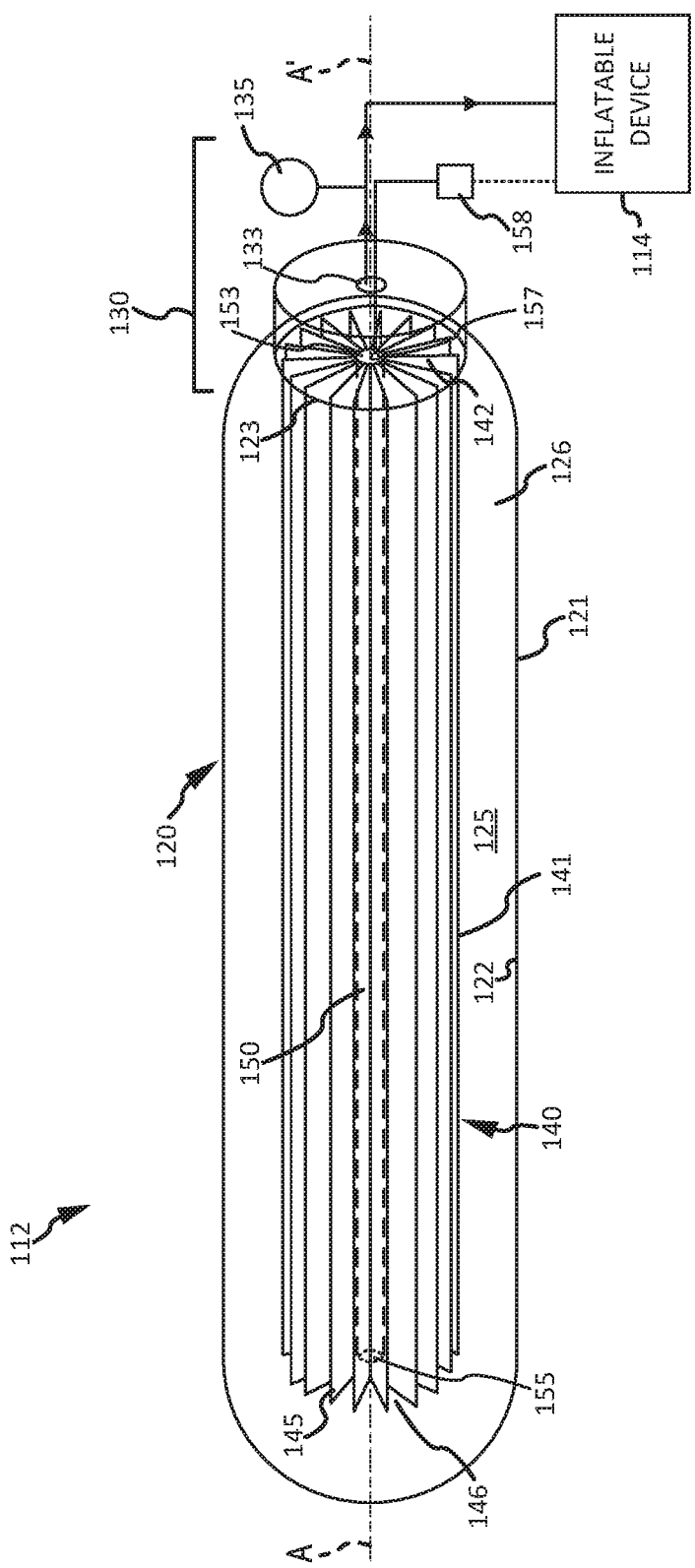
FIG. 2 illustrates a side perspective view of a heated gas cylinder assembly, in accordance with various embodiments.

In various embodiments, and with reference to FIG. 2, a heated gas cylinder assembly 112 is depicted. Heated gas cylinder assembly 112 may include a cylinder shell 120 (e.g., a gas cylinder) configured to contain a gas mixture 126 that is under pressure. Cylinder shell 120 may comprise an outer surface 121 opposite an inner surface 122. Inner surface 122 may define an interior chamber 125 (along with an outer surface 141 of a heat exchanger 140, as discussed below). Inner surface 122 may comprise a metal liner, such as, for example, aluminum and/or aluminum alloy. Outer surface 121 may comprise one or more composite shells made of carbon fiber and/or other types of materials including composites (such as fiber reinforced polymers), metal, nano-fabrics, and/or nano-materials. In various embodiments, outer surface 121 may also include a fiberglass shell disposed on an outer surface of a carbon fiber shell.

In various embodiments, cylinder shell 120 may be configured to contain any desired gas mixture 126, such as, for example carbon dioxide, a carbon dioxide and nitrogen mix, and/or any other suitable gas mixture, and/or a compressed liquid. In various embodiments, gas mixture 126 within cylinder shell 120 may be configured to be pressurized to about 2,300 pounds per square inch gauge (psig) (15,858 kPa) or greater (wherein the term "about" in this context only means +/−1,000 psig (6,895 kPa)). In various embodiments, the pressure of gas mixture 126 within cylinder shell 120 may be based on various factors, such as, for example, gas mixture 126 composition, gas mixture 126 temperature, and/or the like. Cylinder shell 120 may be in fluid communication with an inflatable device 114 (depicted schematically). In that regard, cylinder shell 120 may comprise an outlet 123 configured to allow the flow of gas mixture 126 out cylinder shell 120, and to inflatable device 114. Although heated gas cylinder assembly 112 is depicted as an inflation cylinder for inflatable device 114, it should be understood that the concepts described herein are not limited to use with inflatable devices, as the teachings may be applied to other gas cylinders for use in non-aircraft systems as well.

In various embodiments, heated gas cylinder assembly 112 may comprise an outlet assembly 130. Outlet assembly 130 may be coupled to cylinder shell 120 at outlet 123 and may be configured to maintain and control a release pressure of gas mixture 126 exiting from cylinder shell 120. Outlet assembly 130 may provide gas mixture 126 to inflatable device 114 through outlet 123 and an assembly opening 133 (e.g., a valve and/or the like) of outlet assembly 130. In various embodiments, outlet assembly 130 may also comprise a pressure gauge 135 configured to monitor the pressure of gas mixture 126 in cylinder shell 120. In various embodiments, additional components (not depicted) may be disposed between outlet assembly 130 and inflatable device 114, such as, for example, tubing, an aspirator, and/or other elements. Inflatable device 114 can be, for example, a slide, a raft, a slide/raft combination, and/or any other inflatable device or system configured to receive compressed fluid (e.g., gas mixture 126).

In various embodiments, heated gas cylinder assembly 112 may comprise a heat exchanger 140. Heat exchanger 140 may be configured to provide thermal conduction to gas mixture 126. In that respect, heat exchanger 140 may heat gas mixture 126 to any suitable temperature, such as, for example, about 50° F. (10° C.) to about 60° F. (16° C.), about 60° F. (16° C.) to about 80° F. (27° C.), about 80° F. (27° C.) to about 150° F. (66° C.), and/or about 150° F. (66° C.) to about 200° F. (93° C.) (wherein "about" in this context refers only to +/−5° F. (−12° C.)). Heat exchanger 140 may comprise any suitable thermally conductive material, such as, for example, aluminum, silver, and/or the like. Heat exchanger 140 may be substantially aligned with longitudinal axis A-A', and may comprise a first end 142 axially opposite a second end 146. In various embodiments, first end 142 may be fluidly coupled to and substantially aligned with outlet assembly 130 such that gas mixture 126 may pass through heat exchanger 140 before exiting cylinder shell 120. In various embodiments, heat exchanger 140 may comprise one or more heat exchanger spokes 145 configured to provide additional thermal conduction to gas mixture 126. Heat exchanger spokes 145 may extend in a radial direction away from longitudinal axis A-A' and towards inner surface 122 of cylinder shell 120.

In various embodiments, heat exchanger 140 may comprise an inner bore 150. Inner bore inlet 153 may define a void on first end 142 of heat exchanger 140, extending axially through heat exchanger 140. Inner bore 150 may be substantially aligned with longitudinal axis A-A'. Inner bore 150 may be configured to store a pyrotechnic composition. Inner bore 150 may comprise an inner bore inlet 153 axially opposite an inner bore end 155. In various embodiments, inner bore 150 may be filled, via inner bore inlet 153, with a pyrotechnic composition configured to provide thermal conduction to heat exchanger 140 in response to ignition. In that respect, inner bore 150 may comprise any desired amount of pyrotechnic composition. For example, inner bore 150 may be filled with the pyrotechnic composition from inner bore end 155 to inner bore inlet 153. In various embodiments, the amount of pyrotechnic composition may also be based on a desired final gas temperature, an energy requirement (e.g., temperature change, gas mixture 126 enthalpy, heat exchanger 140 mass, etc.), a desired heat of reaction, a pyrotechnic composition material, a gas mixture, and/or any other suitable operational variable.

In various embodiments, inner bore 150 may comprise any suitable pyrotechnic composition. In various embodiments, inner bore 150 may comprise a pyrotechnic composition that produces no gas during a chemical reaction. In various embodiments, the pyrotechnic composition may comprise a thermite powder. In that regard, the pyrotechnic composition may comprise any suitable thermite powder, such as, for example, a metal oxide aluminum thermite (e.g., a copper oxide aluminum thermite, an iron oxide aluminum thermite, etc.), and/or the like. In various embodiments, in response to the ignition of the pyrotechnic composition in inner bore 150, the pyrotechnic composition may provide thermal conduction to heat exchanger 140, allowing heat exchanger 140 to heat gas mixture 126.

Figure 3:
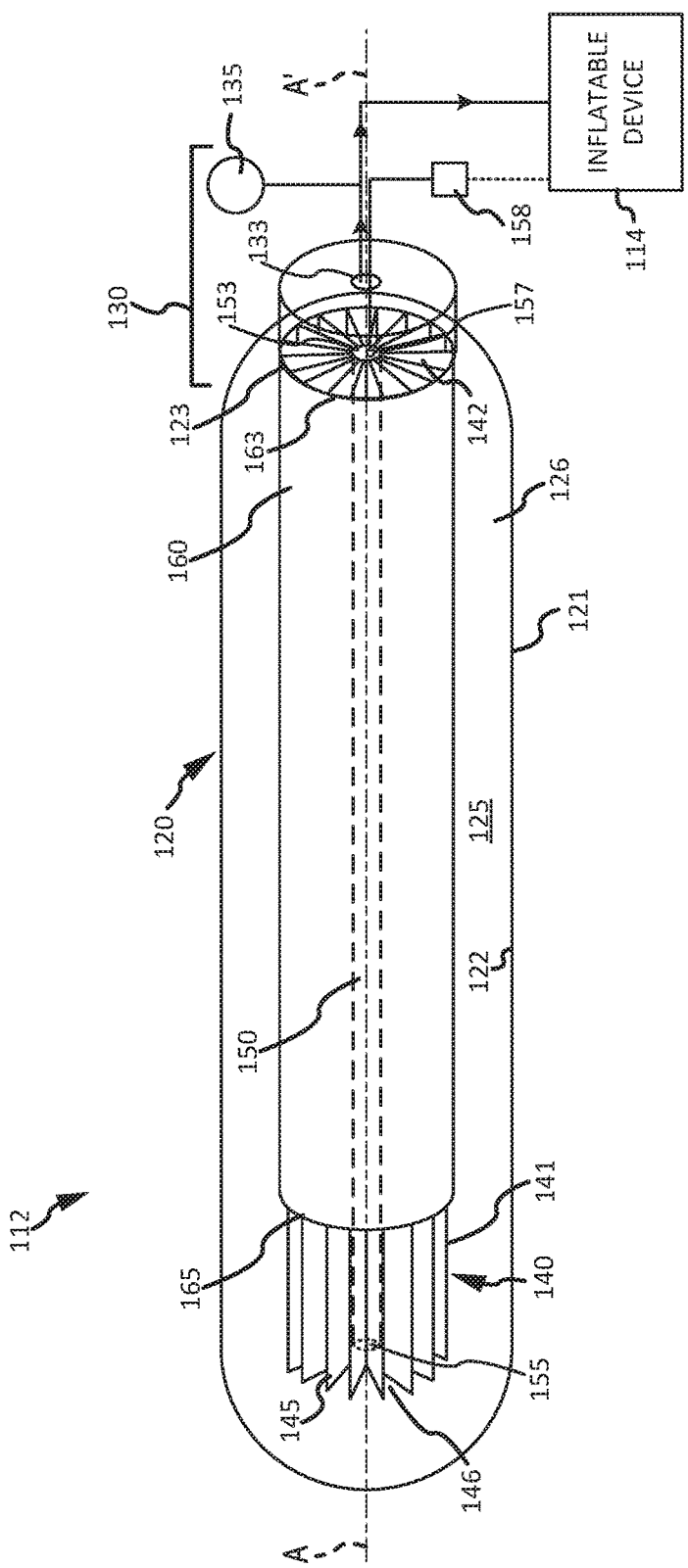
FIG. 3 illustrates a side perspective view of a heated gas cylinder assembly comprising an inner shell, in accordance with various embodiments.

In various embodiments, and with reference to FIG. 3, heated gas cylinder assembly 112 may also comprise an inner shell 160. Inner shell 160 may be configured to direct the flow of gas mixture 126 over heat exchanger 140, before gas mixture 126 can exit cylinder shell 120. In that respect, a second end 163 of inner shell 160 may be fluidly coupled to outlet assembly 130 to enable gas mixture 126 to flow through inner shell 160 and out outlet assembly 130. In various embodiments, inner shell 160 may also be coupled to outer surface 141 of heat exchanger 140 (e.g., inner shell 160 may be coupled to outer surface 141 of heat exchanger spokes 145). In that regard, gas mixture 126 may flow between inner shell 160 and heat exchanger spokes 145 of heat exchanger 140 before exiting cylinder shell 120. Inner shell 160 may comprise any suitable material, such as, for example aluminum, an aluminum alloy, and/or the like.

In various embodiments, inner shell 160 may at least partially cover heat exchanger 140. In that respect, a first end 165 of heat exchanger 140 may extend axially along longitudinal axis A-A' towards second end 146 of heat exchanger 140. For example, and as depicted in FIG. 3, inner shell 160 may only partially cover heat exchanger 140 such that a portion of heat exchanger 140 is exposed to gas mixture 126.

In various embodiments, first end 165 of heat exchanger 140 may also align with second end 146 of heat exchanger 140 such that substantially all heat exchanger 140 is covered by inner shell 160.

In various embodiments, heated gas cylinder assembly 112 may comprise an igniter 157 configured to ignite the pyrotechnic composition in inner bore 150. Igniter 157 may be located in any suitable location capable of igniting the pyrotechnic composition. For example, igniter 157 may be disposed in inner bore inlet 153 in contact with the pyrotechnic composition. Igniter 157 may comprise any suitable device capable of igniting the pyrotechnic composition, such as, for example, a pressure cartridge. In various embodiments, igniter 157 may be configured to ignite the pyrotechnic composition in response to receiving an ignition signal.

In that respect, and in various embodiments, igniter 157 may be in logical and/or electronic communication with an igniter control 158. Igniter control 158 may be configured to transmit an ignition signal to igniter 157 to control ignition of the pyrotechnic composition. Igniter control 158 may comprise any suitable device, processor, and/or the like capable of transmitting the ignition signal to igniter 157 to cause igniter 157 to ignite the pyrotechnic composition. For example, and in various embodiments, igniter control 158 may be configured to transmit the ignition signal to igniter 157 in response to activation of an evacuation system. For example, and with brief reference to FIG. 1, igniter control 158 may transmit the ignition signal in response to the jettison of panel 110, the deployment of inflatable device 114, and/or at any other suitable event. In that respect, igniter control 158 may comprise a switch, and/or the like, positioned to trigger igniter control 158 in response to the jettison of panel 110 and/or the deployment of inflatable device 114. In various embodiments, igniter control 158 may also be in logical and/or electronic communication with a processor. In that respect, igniter control 158 may be commanded via the processor to transmit ignition signal. For example, the processor may command ignitor control 158 in response to an aircraft emergency, pilot control, and/or the like.

Figure 4:
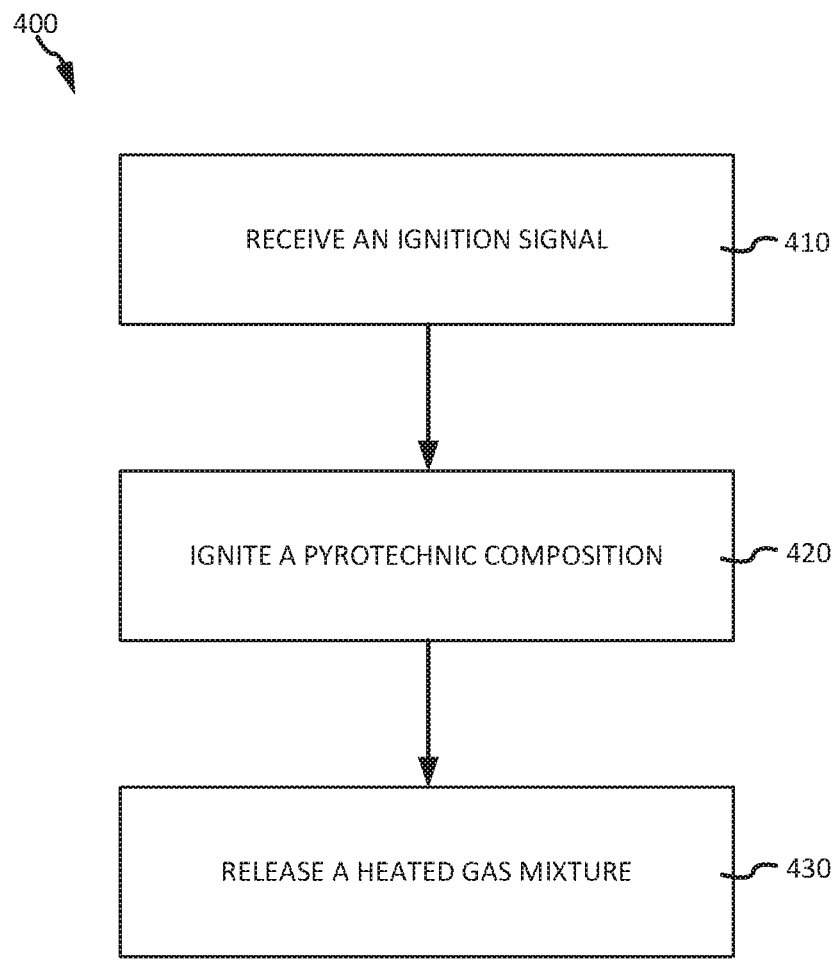
FIG. 4 illustrates a method of releasing a heated gas mixture.

In various embodiments, and with reference to FIG. 4, a method 400 of releasing a heated gas mixture is disclosed. Method 400 may allow for the simultaneous, or near simultaneous, heating and releasing of a gas mixture, or may also allow for the preheating of a gas mixture prior to release. In various embodiments, method 400 may comprise receiving an ignition signal (step 410). With brief reference to FIGS. 2 and 3, the ignition signal may be transmitted by igniter control 158 and received by igniter 157. The ignition signal may be transmitted in response to an evacuation system deploying, and/or in response to any other suitable event. In various embodiments, method 400 may comprise igniting a pyrotechnic composition (step 420). With brief reference to FIGS. 2 and 3, igniter 157 may ignite the pyrotechnic composition in response to receiving the ignition signal from igniter control 158. In response to ignition, the pyrotechnic composition may provide thermal conduction to heat exchanger 140, enabling heat exchanger 140 to provide thermal conduction to heat gas mixture 126. In various embodiments, method 400 may comprise releasing the heated gas mixture (step 430). With brief reference to FIGS. 2 and 3, the heated gas mixture 126 may be released from cylinder shell 120 via outlet 123 and assembly opening 133 of outlet assembly 130. In that regard, the heated gas mixture 126 may be provided to inflatable device 114.

In various embodiments, step 420 and step 430 may occur simultaneously, or near simultaneously. In that respect, gas mixture 126 may be heated by heat exchanger 140 and released via outlet assembly 130. For example, and with brief reference to FIG. 3, heated gas cylinder assembly 112 may ignite the pyrotechnic composition and open assembly opening 133 of outlet assembly 130. Gas mixture 126 may flow between heat exchanger 140 and first end 165 of inner shell 160, before flowing through inner shell 160 and out outlet assembly 130. In that respect, inner shell 160 may force gas mixture 126 to flow between heat exchanger 140 and inner shell 160, thus enabling gas mixture 126 to be heated by heat exchanger 140 prior to exiting outlet assembly 130.

In various embodiments, step 420 may also occur prior to step 430, such that gas mixture 126 is preheated before it is released. For example, and with brief reference to FIG. 2, heated gas cylinder assembly 112 may ignite the pyrotechnic composition to provide thermal conduction to gas mixture 126. Outlet assembly 130 may be configured to delay the flow of gas for a predetermined time (e.g., 5 seconds, 30 seconds, 1 minute, etc.), to allow gas mixture 126 to preheat prior to release. After the predetermined time, outlet assembly 130 may open to allow the flow of the heated gas mixture 126.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of releasing a heated gas mixture, comprising:
    igniting a pyrotechnic composition, wherein the pyrotechnic composition is dispersed within an inner bore of a heat exchanger, the heat exchanger is disposed within a gas cylinder, and the gas cylinder and the heat exchanger define an interior chamber comprising a gas mixture;
    heating, by the heat exchanger, the gas mixture to create the heated gas mixture, wherein the heat exchange comprises a heat exchanger spoke extending radially outward from the heat exchanger; and
    releasing the heated gas mixture from an outlet of the gas cylinder, wherein the heat exchanger and the heat exchanger spoke are in fluid communication with the outlet, and wherein the outlet is in fluid communication with the interior chamber.

2. The method of claim 1, wherein the gas mixture is heated for a predetermined time prior to releasing the heated gas mixture.

3. The method of claim 1, wherein the gas cylinder comprises an inner shell coupled to the outlet and configured to at least partially cover the heat exchanger, and wherein the inner shell is configured to enable a flow of the heated gas mixture between the heat exchanger and the inner shell through the outlet.

4. The method of claim 3, wherein the heated gas mixture is heated and released simultaneously.

5. The method of claim 1, further comprising transmitting, by an igniter control, an ignition signal to an igniter disposed within the pyrotechnic composition, wherein the igniter is configured to ignite the pyrotechnic composition in response to receiving the ignition signal.

* * * * *